United States Patent
Blackford et al.

(10) Patent No.: US 11,238,707 B2
(45) Date of Patent: Feb. 1, 2022

(54) METHOD OF OPERATING AN AUTOMATED TRANSACTION MACHINE FOR ENHANCED SECURITY

(71) Applicant: Diebold Nixdorf, Incorporated, North Canton, OH (US)

(72) Inventors: Damon J. Blackford, Akron, OH (US); Rod Beaber, North Canton, OH (US); Ricardo Barros, Macedonia, OH (US); Bernd Redecker, Luebbecke (DE)

(73) Assignee: Diebold Nixdorf, Incorporated, North Canton, OH (US)

( * ) Notice: Subject to any disclaimer, the term of this patent is extended or adjusted under 35 U.S.C. 154(b) by 0 days.

(21) Appl. No.: 16/972,229

(22) PCT Filed: Jun. 20, 2019

(86) PCT No.: PCT/US2019/038144
§ 371 (c)(1),
(2) Date: Dec. 4, 2020

(87) PCT Pub. No.: WO2020/005687
PCT Pub. Date: Jan. 2, 2020

(65) Prior Publication Data
US 2021/0233366 A1     Jul. 29, 2021

Related U.S. Application Data

(60) Provisional application No. 62/691,054, filed on Jun. 28, 2018.

(51) Int. Cl.
*G06Q 20/10* (2012.01)
*G07F 19/00* (2006.01)
(Continued)

(52) U.S. Cl.
CPC ........ *G07F 19/205* (2013.01); *G06Q 20/1085* (2013.01); *G06Q 20/4012* (2013.01); *G07F 19/206* (2013.01); *G06F 21/602* (2013.01)

(58) Field of Classification Search
CPC ...... G07F 19/205; G07F 19/206; G07F 19/20; G07F 19/207; G06Q 20/1085; G06Q 20/4012; G06Q 20/4014; G06F 21/602
See application file for complete search history.

(56) References Cited

U.S. PATENT DOCUMENTS

2001/0032118 A1   10/2001   Carter
2005/0173515 A1 *  8/2005   Sawa ................... G07F 19/207
                                                           235/379
(Continued)

FOREIGN PATENT DOCUMENTS

EP          3792886 A1 *  3/2021   ........... G07D 11/235

OTHER PUBLICATIONS

Prineta: How to load cash in an ATM Machine, Mar. 10, 2016, pp. 1-16 (Year: 2016).*
(Continued)

*Primary Examiner* — Bijendra K Shrestha
(74) *Attorney, Agent, or Firm* — Black, McCuskey, Souers & Arbaugh, LPA

(57) ABSTRACT

A method of operating an automated transaction machine (ATM) can include receiving a token from a user. The method can also include confirming a personal identification number (PIN) of the user and dispensing banknotes in response to the confirming. The method can also include at least partially disengaging a first component of the ATM from a remainder of the ATM. The method can also include altering the first component to a non-conforming condition after being at least partially disengaged. The method can also include re-engaging the first component with the ATM
(Continued)

after being altered. The method can also include replacing a second component of the ATM after the re-engaging. Replacing the second component can include pairing the second component with a computing device of the ATM. The pairing can be responsive at least in part to the altering.

20 Claims, 9 Drawing Sheets

(51) Int. Cl.
　　　*G06Q 20/40*　　　(2012.01)
　　　*G06F 21/60*　　　(2013.01)

(56) References Cited

U.S. PATENT DOCUMENTS

2007/0013124 A1　1/2007　Graef
2009/0108059 A1　4/2009　Aas

OTHER PUBLICATIONS

Fujitsu: Fujitsu to demonstrate how innovative use of currency handling PalmSecure Biometric and New RFID Technologies will improve Security and Accountability during cash handling process for casino customers and employees at G2E Las Vegas, Sep. 30, 2014, pp. 1-2 (Year: 2014).*
International Report on Patentability and Written Opinion of the International Searching Authority filed in the corresponding PCT application dated Dec. 29, 2020; 5 pages.

* cited by examiner

METHOD OF OPERATING AN AUTOMATED TRANSACTION MACHINE FOR ENHANCED SECURITY

CROSS-REFERENCE TO RELATED APPLICATIONS

This application is a national phase application of PCT/US2019/038144, for a METHOD OF OPERATING AN AUTOMATED TRANSACTION MACHINE FOR ENHANCED SECURITY, filed on Jun. 20, 2019, which claims the benefit of U.S. Provisional Patent Application Ser. No. 62/691,054 for a METHOD OF OPERATING AN AUTOMATED TRANSACTION MACHINE FOR ENHANCED SECURITY, filed on Jun. 28, 2018, which are hereby incorporated by reference in their entireties.

BACKGROUND

1. Field

This relates in general to a method of operating an automated transaction machine (ATM) for enhanced security.

2. Description of Related Prior Art

U.S. Pat. No. 9,858,571 discloses methods and systems for mitigating fraud losses during a payment card transaction. As alleged in the '571 patent, computer systems and methods for identifying a potentially fraudulent payment card transaction in progress, and mitigating losses arising from completion of a fraudulent payment card transaction are provided. The computer system is programmed to receive an authorization request message for authorization of a payment card-initiated transaction, when the transaction is initiated using a payment card that includes a first security device operable for transactions initiated within a predefined geographic region and a second security device operable for transactions initiated both within the predefined geographic region and outside of the predefined geographic region. When the transaction is initiated outside the predefined geographic region, the computer system compares data on the payment card to stored data corresponding to a plurality of payment cards previously-approved for transactions outside of the predefined geographic region approval, and applies one or more sets of rules to the transaction as appropriate.

U.S. Pub. No. 20010032118 discloses a system, method, and computer program for managing storage and distribution of money tills. A computer-controlled automated management system for monitoring and controlling distribution and storage of money tills, and linking tracking of employee productivity to time in receipt of a till. The system comprises a cabinet, a control panel, and a personal computer. The cabinet is mounted through a wall to provide an interface having a front side accessible from a first area and a rear side accessible from a second area, such as, for example, a cash room. The control panel is mounted next to the cabinet on the front side of the wall. The interior cabinet space is divided into a plurality of till compartments, with each compartment being selectively accessible from both the front and rear of the cabinet. Tills are loaded and removed from the rear by cash room personnel and from the front by cashiers and other employees. In order to remove a till from the front of the cabinet, the employee must identify him or herself using a keypad or other device provided at the control panel, which, in turn, communicates the information to the computer. The computer receives the identification information and matches it to employee and authorization information stored in a database. The computer is then able to match the particular employee with a particular till in a particular compartment. The computer records the time and other relevant data and opens the appropriate cabinet door to allow the employee to take the till. When the employee returns the till, a similar process occurs. The system is further operable to anticipate, based upon work schedules, needed till types or amounts; compile and maintain useful associated records, including employee productivity (i.e., time in possession of a till); and link to and integrate with other systems to further improve efficiency.

U.S. Pub. No. 20070013124 discloses a polymer divert cassette for ATM currency. A polymer currency cassette for an ATM. The cassette includes a one-piece polymer body attached to a one-piece polymer lid. The lid is arranged with the body to resist entry into the cassette interior. Integral stiffening ribs are provided. The body side walls include integrally formed guide tracks. A one-piece tambour door is securely movable along the guide tracks. The upper edge of each body side wall extends into a gap created between double-walled side walls of the lid when the lid is closed. A tab, which projects outward from an upper edge of a body side wall, extends even further into the closed lid. The tab becomes nested in an aligned slot in the lid when the lid is closed. A nested tab affords further cassette security by providing resistance to lid and body separation.

U.S. Pub. No. 20090084841 discloses an AUTOMATED BANKING MACHINE CURRENCY CASSETTE WITH RFID TAG. An ATM currency cassette includes an RFID tag. The tag includes information about the cassette, such as the cassette serial number and the currency denomination. An ATM includes a tag reader that can interrogate the tag to receive the information. The history of a particular cassette can be tracked via the cassette serial number. Problem cassettes can be identified.

U.S. Pub. No. 20090108059 discloses cash handling. Cash handling in a cash handling system is described in terms of methods and arrangements that interact by exchanging cash as well as information signals. A cash transport unit is configured to receive, store and provide cash, preferably in the form of notes. The transport units connect with ATM's, shops, vehicles as well as cash docking stations. Information flows among the entities of the system, between the transport units, the shops, the vehicles, the docking stations, a transport service control center, cash centers as well as banks.

U.S. Pub. No. 20100156036 discloses a lockable removable cassette. A lockable, removable cassette is described. In an implementation, the cassette includes a plastic shell and a currency access door. The cassette may also include a flexible handle and/or an integrated grip. In addition, the cassette may include at least one of an aperture and a transparent window positioned to reveal the contents of the cassette. In an implementation, the cassette includes a stacking mechanism which may include a drive means having non-circular drive gears.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of operating an automated transaction machine (ATM) can include receiving, at an ATM, a token from a user. The method can also include confirming, with the ATM, a personal identification number (PIN) of the user. The method can also include dispensing, with the ATM, banknotes to the user in response to the confirming. The method can also include at least partially disengaging a first component of the ATM from a remainder of the ATM after the dispensing. The method can also include altering the first component of the ATM to a condition that renders the first component non-conforming after the at least partially disengaging. The method can also include re-engaging the first component with the remainder of the ATM after the altering. The method can also include replacing a second component of the ATM after the re-engaging. Replacing the second component can include pairing the second component of the ATM with a computing device of the ATM. The pairing can be responsive at least in part to the altering.

According to other features, the at least partially disengaging can be further defined as at least partially disengaging the first component that can be positioned within a safe of the ATM during the dispensing from the remainder of the ATM after the dispensing. The replacing of the second component can be further defined as replacing, after the re-engaging, the second component of the ATM that can be positioned outside of the safe during the dispensing, including pairing the second component of the ATM with the computing device of the ATM, wherein the pairing can be responsive at least in part to the altering.

In other features, the altering can be further defined as physically modifying the first component. The altering can be further defined as removing a portion of the first component from a remainder of the first component. The altering can be further defined as removing a button that can be slidably received in an aperture defined by the first component. The altering can be further defined as removing the button that can be slidably received in the aperture defined by the first component and directed away from a door of the safe during the dispensing. The re-engaging can be further defined as repositioning the first component in a safe of the ATM, without the portion removed during the removing, with the remainder of the ATM after the altering.

According to additional features, the method can also include at least partially disengaging the first component of the ATM from the remainder of the ATM a second time, after the replacing of the second component. The method can also include restoring the first component of the ATM to a conforming condition after the at least partially disengaging the first component of the ATM from the remainder of the ATM the second time. The method can also include re-engaging the first component with the remainder of the ATM a second time, after the restoring. The method can also include repeating the receiving, the confirming, and the dispensing after the re-engaging.

According to other features, the method can also include placing a first processing device of the ATM in a maintenance mode of operation after the dispensing and before the at least partially disengaging the first component of the ATM from the remainder of the ATM. The method can also include testing a conformance of the first component after the placing and before the at least partially disengaging the first component of the ATM from the remainder of the ATM.

The method can also include at least partially disengaging the first component of the ATM from the remainder of the ATM a second time, after the replacing of the second component. The method can also include restoring the first component of the ATM to a conforming condition after the at least partially disengaging the first component of the ATM from the remainder of the ATM the second time. The method can also include re-engaging the first component with the remainder of the ATM a second time, after the restoring. The method can also include rebooting the first processing device button after the re-engaging. The method can also include pairing the first processing device with the computing device of the ATM after the rebooting. The method can also include removing the first processing device from maintenance mode after the pairing.

In other features, the at least partially disengaging can be further defined as at least partially disengaging the first component that can be a currency cassette of the ATM from a remainder of the ATM after the dispensing. The replacing can be further defined as replacing a second component of the ATM that can be memory accessed by a computing device of the ATM during at least one of the confirming and the dispensing.

According to additional features, the method can also include detecting, with the computing device of the ATM, non-conformance of the first component of the ATM after the re-engaging. The replacing can be further defined as replacing the second component of the ATM after the re-engaging, including pairing the second component of the ATM with the computing device of the ATM. The pairing can be responsive at least in part to the altering and the detecting of non-conformance can be required to complete the pairing. The method can also include detecting, with the computing device of the ATM, conformance of the first component of the ATM prior to the receiving. The detecting can further comprise detecting, with the computing device of the ATM, a physical characteristic of the first component to determine non-conformance of the first component.

DETAILED DESCRIPTION

Generally, the present disclosure is desirable to enhance the security of ATMs. ATMs are used by bank account holders to withdraw currency or bank notes, or to make deposits of such notes. Often, in order to initiate an exchange at the ATM, the user must be authenticated. This process can include the user presenting a token in the form of a bank card and entering a personal identification number (PIN). When this information is confirmed, the user is authenticated and the ATM can dispense banknotes to the user.

Over time, the sub-components of the ATM can require replacement. One such component is memory. When sub-components of the ATM are replaced, a replacement component may require electronic pairing with one or more existing components of the ATM. The electronic pairing of a replacement ATM component typically includes one or more security protocols to inhibit fraudulent activity. The present disclosure provides a novel and non-obvious method of pairing a replacement component in an ATM that enhances security and inhibits fraud.

It has been observed that fraudulent activity can be perpetrated wherein the ATM can be caused to dispense relatively large quantities of bank notes, very quickly, to someone who is not entitled to such a dispensation. This is known as "jackpotting." The present disclosure provides an ATM and a process implemented at least in part by the ATM that requires full access to a safe of the ATM and the process can prevent jackpotting. The process can supplement existing bank security approvals and controls for safe access.

Figure 1:
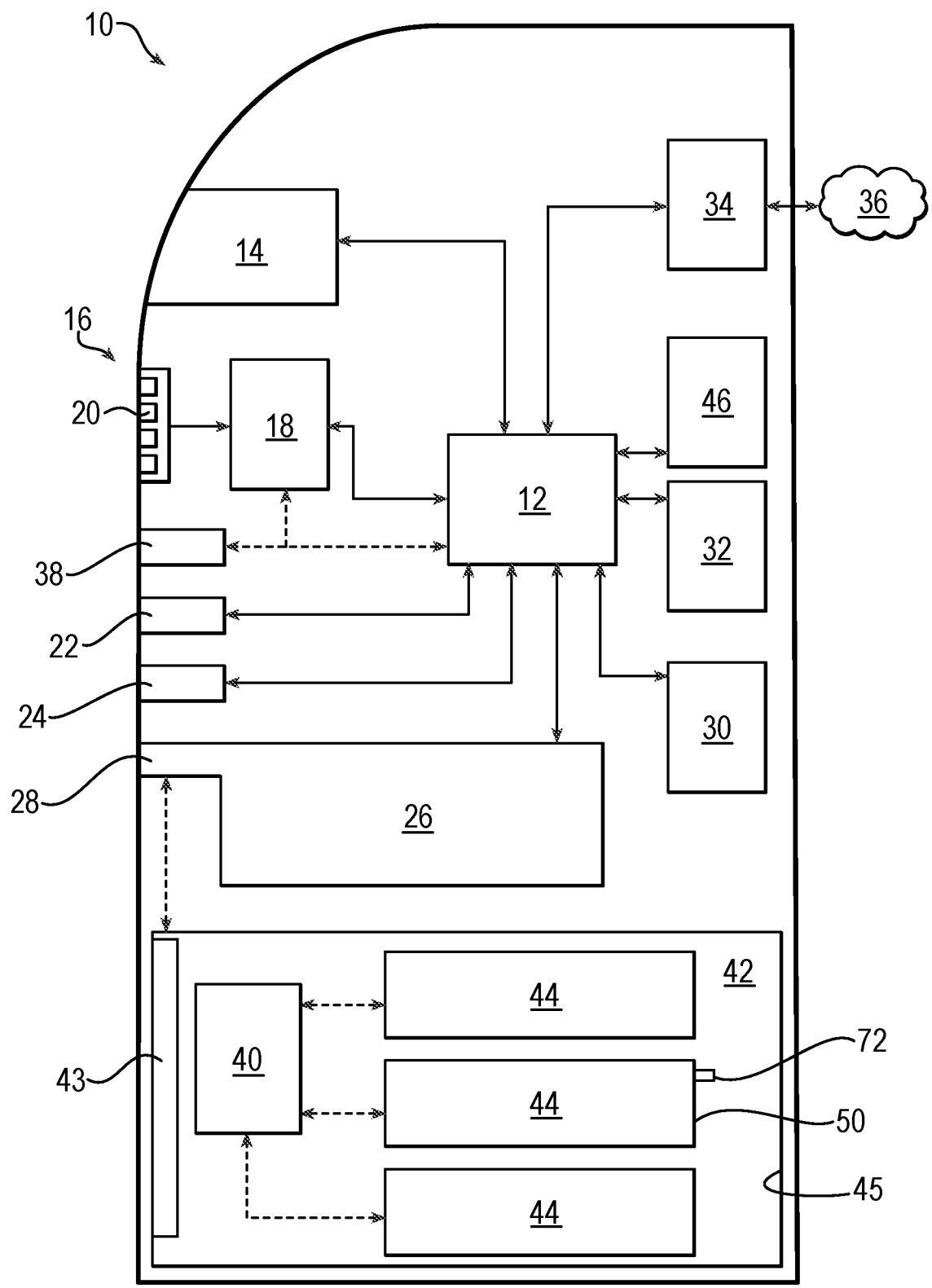
FIG. 1 is a functional block diagram of an exemplary ATM according to one or more implementations of the present disclosure.
Figure 2:
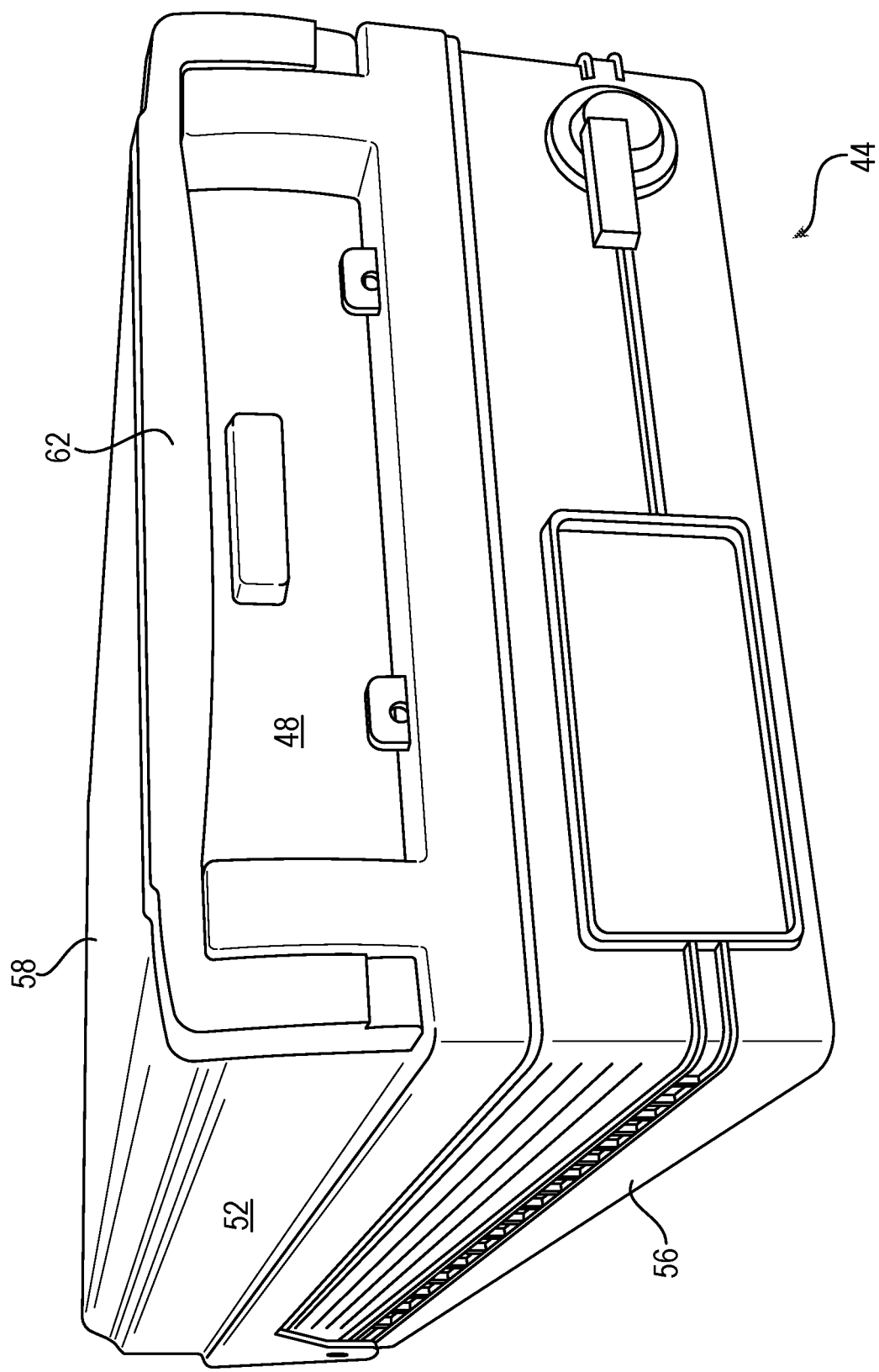
FIG. 2 is a first perspective view of an exemplary cassette utilized in an ATM according to one or more implementations of the present disclosure, the perspective generally from the front and left of the cassette.
Figure 3:
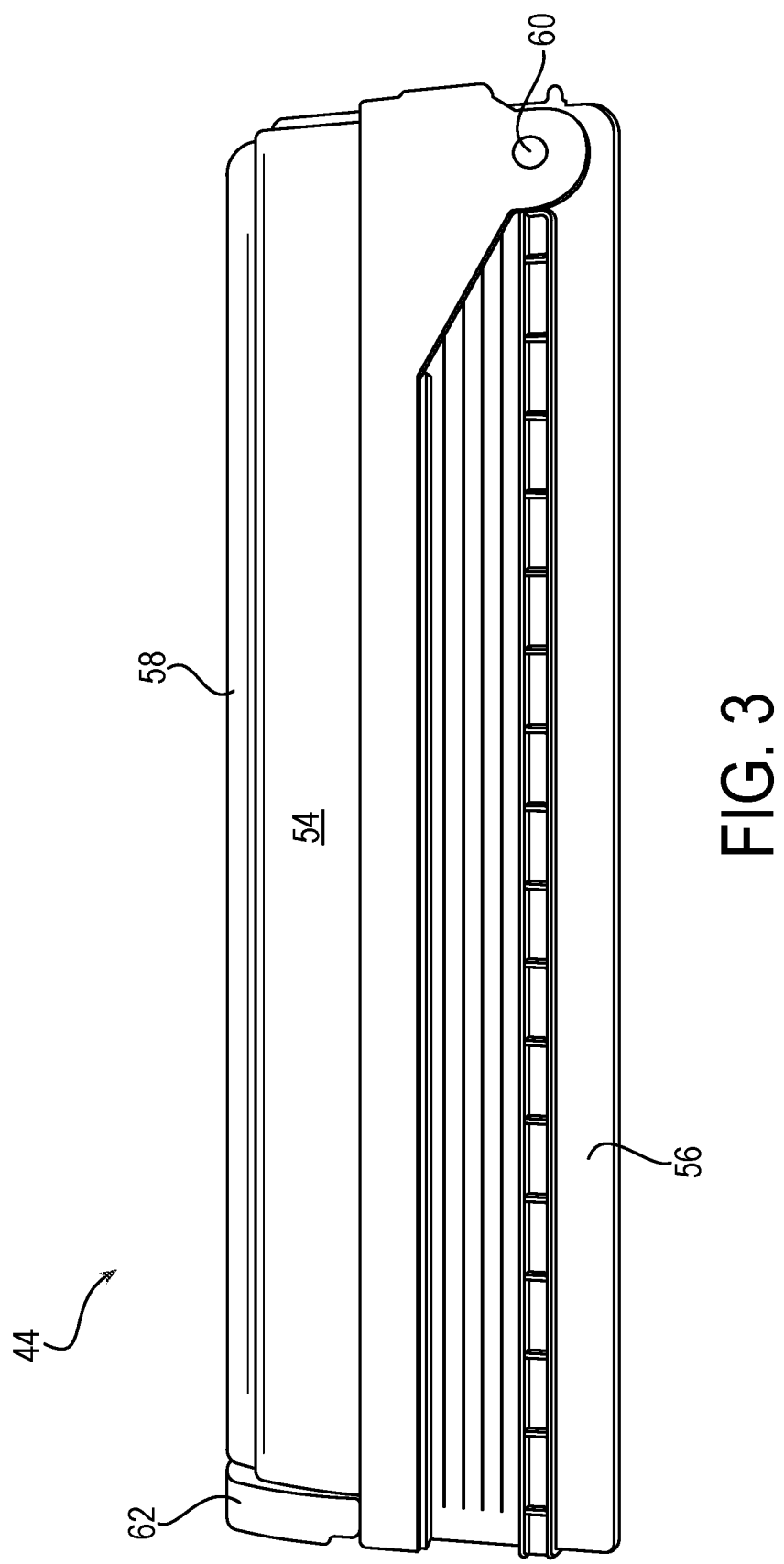
FIG. 3 is a right-side view of the exemplary cassette shown in FIG. 2.
Figure 4:
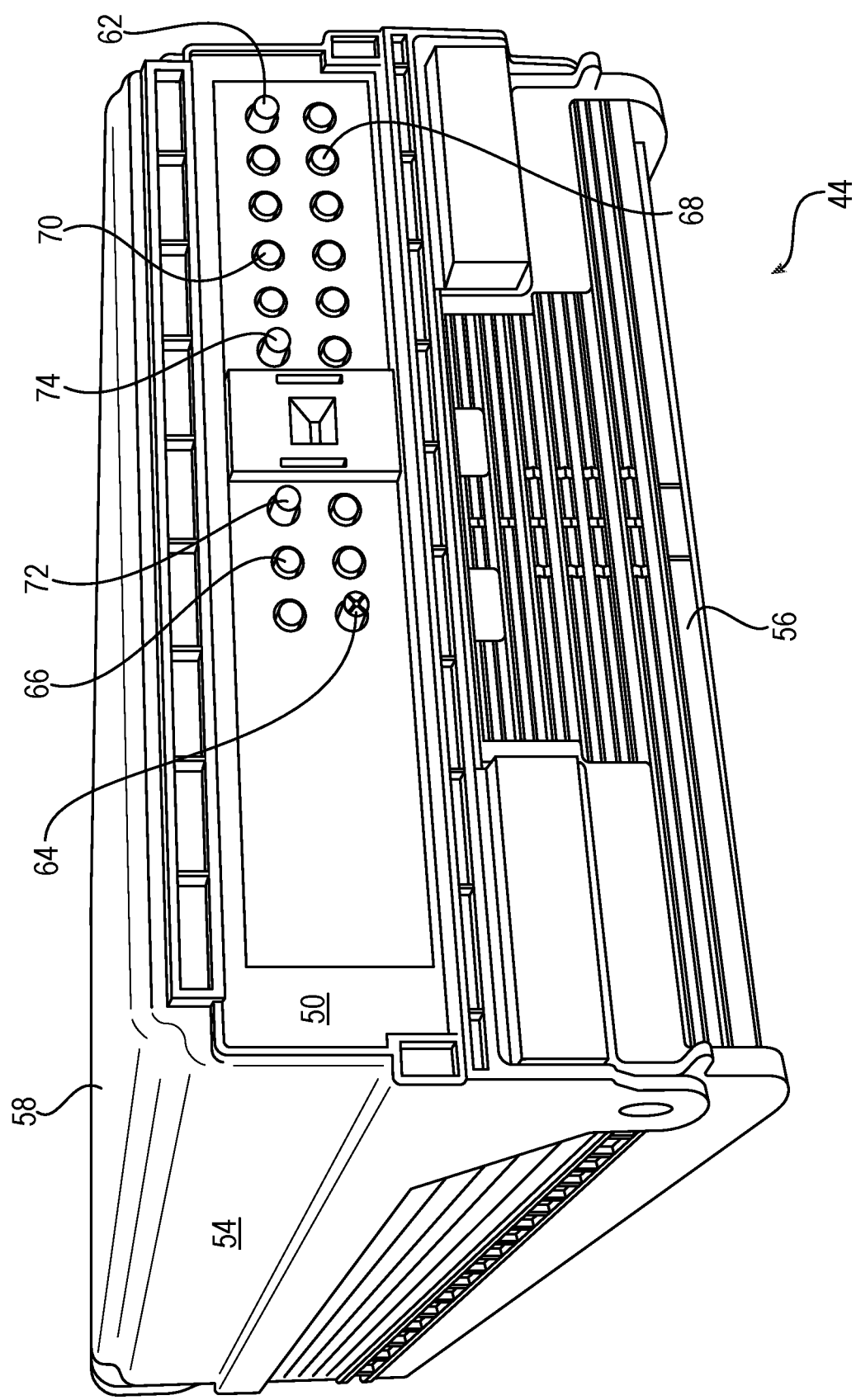
FIG. 4 is a second perspective view of the exemplary cassette shown in FIGS. 2 and 3, the perspective generally from the rear and right of the cassette.
Figure 5:
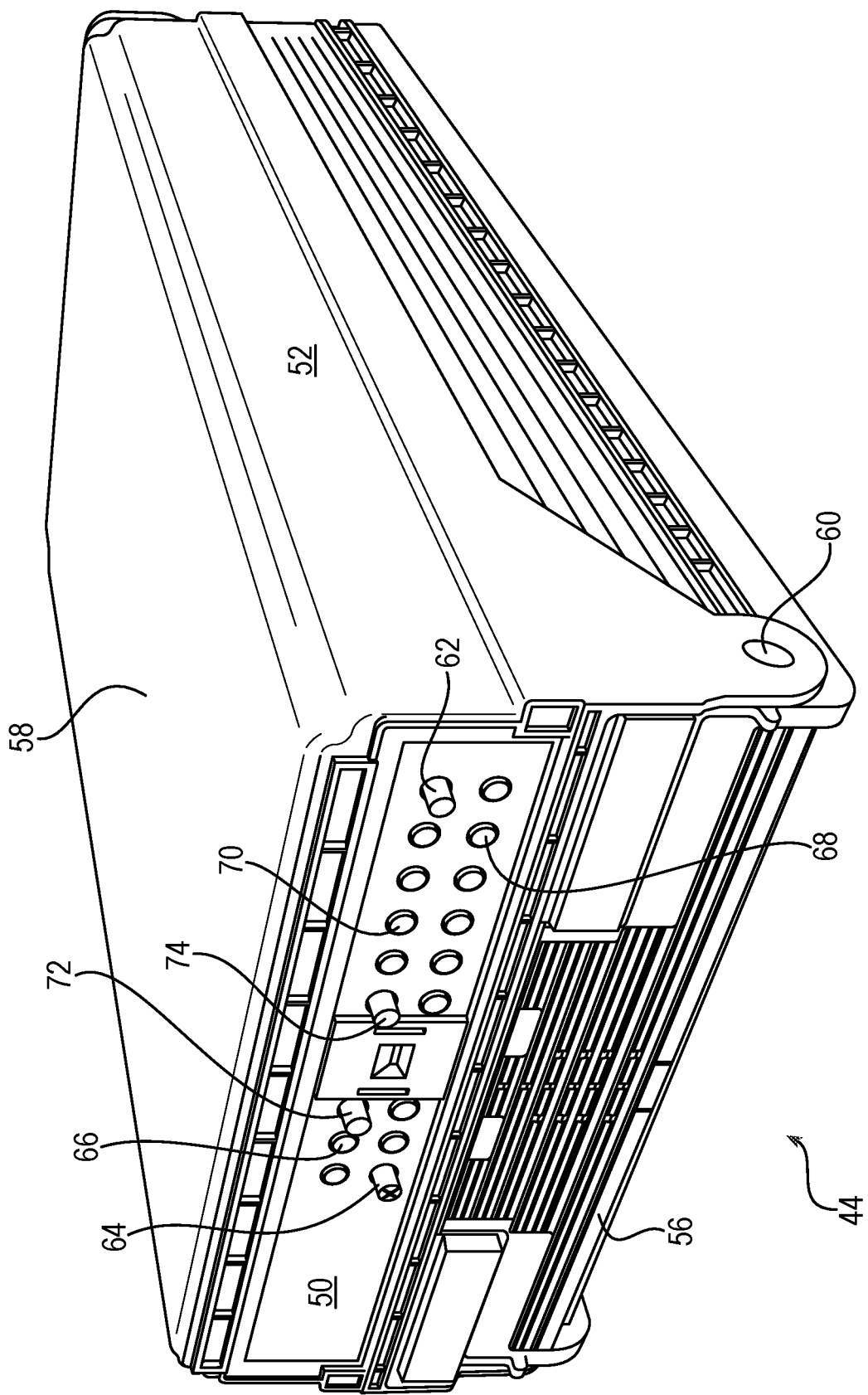
FIG. 5 is a third perspective view of the exemplary cassette shown in FIGS. 2-4, the perspective generally from the rear and left of the cassette.
Figure 6:
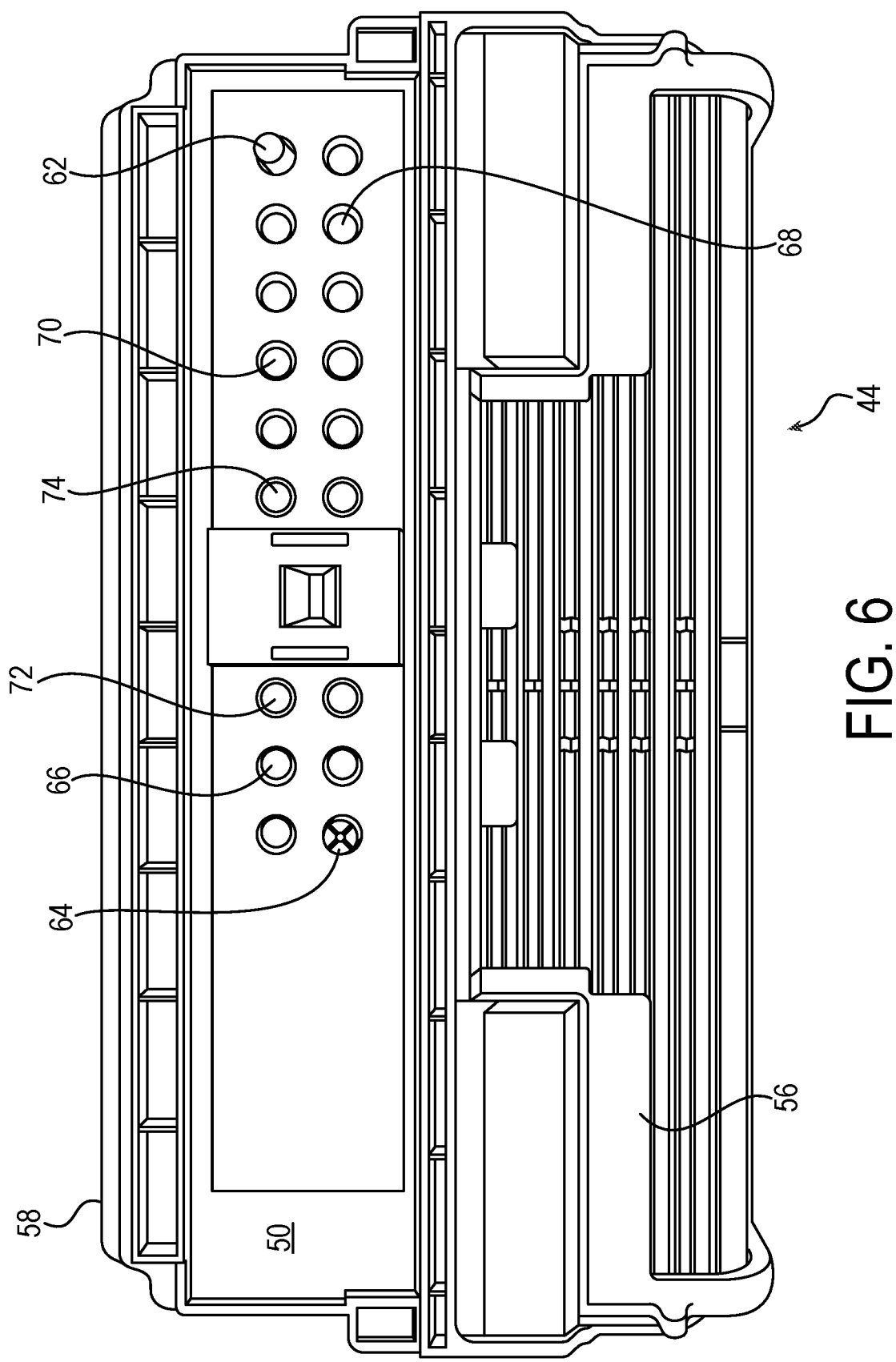
FIG. 6 is a rear view of the exemplary cassette shown in FIGS. 2-5.
Figure 7:
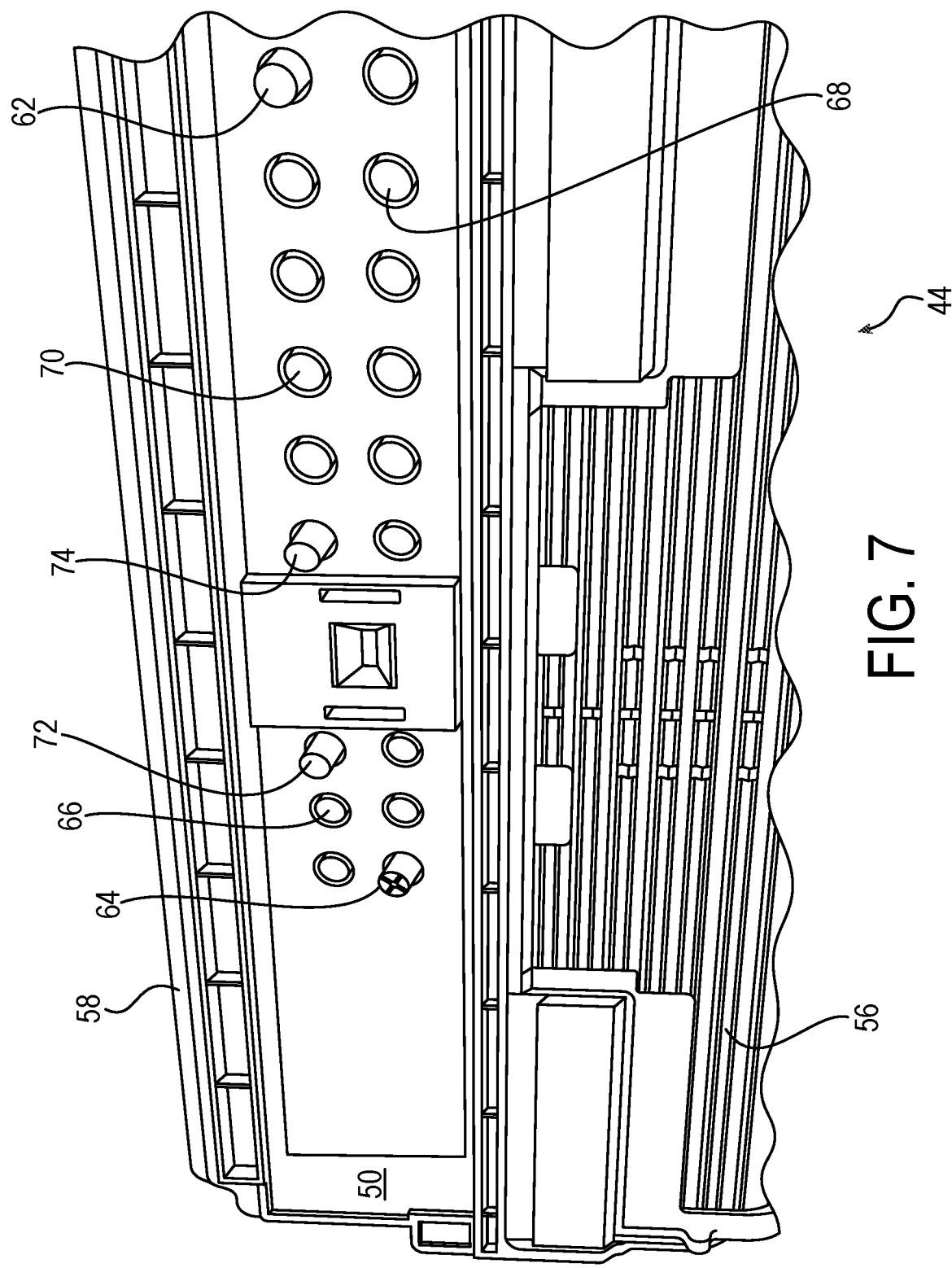
FIG. 7 is a fourth perspective view of a portion of the exemplary cassette shown in FIGS. 2-6, the perspective generally from the rear and left of the cassette, the view magnified relative to the view shown in FIG. 5.

Referring now to the drawings, FIG. 1 discloses a functional block diagram of an exemplary ATM 10 according to one or more implementations of the present disclosure. It will be understood that embodiments of the present disclosure are applicable to other types of SSTs, such as vending machines and kiosks, by way of example and not limitation. The ATM 10 includes different structures and subsystems for executing and recording transactions. The ATM 10 includes a computing device 12. The exemplary computing device 12 has one or more processors and a non-transitory, computer readable medium 46. The computing device 12 operates under the control of an operating system, kernel and/or firmware and executes or otherwise relies upon various computer software applications, components, programs, objects, modules, data structures, etc. The exemplary computing device 12 can operate under the control of the Windows® operating system. The computer readable medium (memory) 46 of the computing device 12 can include random access memory (RAM) devices comprising the main storage of computing device 12, as well as any supplemental levels of memory, e.g., cache memories, non-volatile or backup memories (e.g., programmable or flash memories), read-only memories, etc. The memory 46 can be accessed by the computing device 12 during operation for control logic, such as commands to execute in assessing financial transactions requested by a user. Such transactions can require confirming the authority of the user to complete a financial transaction and can also include dispensing of banknotes. In addition, memory may be considered to include memory storage physically located elsewhere in computing device 12, such as any cache memory in a processor, as well as any storage capacity used as a virtual memory. The computing device 12 can also include one or more mass storage devices, e.g., a floppy or other removable disk drive, a hard disk drive, a direct access storage device (DASD), an optical drive (e.g., a CD drive, a DVD drive, etc.), and/or a tape drive, among others for memory 46.

The exemplary ATM 10 also includes a display 14. The computing device 12 can control the display 14 to present information to the user for furthering completion of the transaction. The display 14 can be a touch screen that allows the user to enter information through the display 14. The exemplary display 14 is configured to transmit any user-entered information to the computing device 12.

The exemplary ATM 10 also includes a key pad 16 and an encryption module 18. Generally, the combination of a key pad and an encryption module are referred to in the art as an encrypted PIN pad (EPP). The exemplary key pad 16 includes a plurality of keys, such as key 20. The exemplary encryption module 18 has one or more processors and a non-transitory, computer readable medium. The user can press the keys of the key pad 16 to enter a PIN. The key pad is placed in communication with the encryption module 18 and therefore the numbers of the PIN are received by the encryption module 18. It is noted that the communication of the PIN is direct and secure; the PIN cannot be intercepted between the key pad 16 and the encryption module 18. The PIN is then encrypted by the encryption module to define a PIN block. The encryption module 18 includes a network encryption key and applies the network encryption key to encrypt the PIN to a PIN block. The exemplary encryption module 18 is configured to transmit the PIN block to the computing device 12.

The exemplary ATM 10 also includes a card module 22. The card module 22 can receive a token from the user, such as a card. The card module 22 can be configured to execute read and write operations with respect to any storage medium fixed to the user's card. The exemplary card module 22 is configured to transmit any data read from the user's card to the computing device 12. The exemplary card module 22 can also be configured to receive commands and data from the computing device 12 and change data stored on the user's card.

The exemplary ATM 10 also includes a printer module 24. The computing device 12 can control the printer module 24 to print a receipt when a transaction has been completed. The printer module 24 can communicate one or more messages to the computing device 12, such as a maintenance message regarding the need to refill printer paper.

The exemplary ATM 10 also includes a recycler or cash dispenser/receiver 26. The recycler 26 can be configured to receive items such as bank notes (cash) and checks and also be configured to dispense banknotes. The exemplary recycler 26 communicates with a slot 28 defined on an exterior of the ATM 10 for the passage of such items. In other embodiments of the present disclosure, the recycler 26 can be configured to facilitate the exchange of other items. The recycler 26 can include one or more sensors and transmit signals from any such sensors to the computing device 12 to execute an exchange. The computing device 12 can control the recycler 26 in response to such signals. For example, the recycler 26 can include a sensor that detects receipt of an item such as a check. The recycler 26 can include a further sensor in the form of a scanner that generates an image of the received item and transmits the image to the computing device 12.

The exemplary ATM 10 also includes a printer module 30. The printer module 30 can generate a continuous record of all transactions executed by the ATM 10. The computing device 12 can control the printer module 30 to supplement the record after each transaction has been completed. The printer module 30 can communicate one or more messages to the computing device 12, such as a maintenance message regarding the need to refill printer paper.

The exemplary ATM 10 also includes an access module 32. The access module 32 can be positioned proximate to a rear side of the ATM 10. The access module 32 can be utilized for service and support technicians. For example, the access module 32 can be utilized by a field engineer to complete software updates to the computing device 12. The access module 32 can also be utilized when non-software updates and maintenance is performed, such as the refilling of printer paper or currency.

The exemplary ATM 10 also includes a transceiver 34. The exemplary transceiver 34 is configured to facilitate communication between the computing device 12 and other computing devices that are distinct from and physically remote from the computing device 12. An example of such a remote computing device is a server computing device, such as a banking server communicating with a plurality of ATMs. The exemplary transceiver 34 places the computing device 12 in communication with one or more networks, such as network 36. The network 36 can be a local area network (LAN), a wide area network (WAN) such as the Internet, or any combination thereof. The transceiver 34 can transmit data and requests for input generated by the computing device 12 and receive responses to these requests, directing these responses to the computing device 12. The computing device 12 can transmit the PIN block to a remote computing device such as a bank server to confirm the PIN entered by the user.

The exemplary ATM 10 also includes a transceiver 38. The exemplary transceiver 38 is configured to facilitate communication between at least one of the encryption module 18 and the computing device 12 and other computing devices that are distinct from and physically proximate to the ATM 10. An example of such a proximate computing device is a smartphone possessed by the user. The dashed connection lines in FIG. 1 represent optional interconnections. The exemplary transceiver 38 can place the user's smartphone in communication with the encryption module 18, the computing device 12, or both. The exemplary transceiver 38 can implement various communication protocols. For example, the transceiver 38 can be a Near Field Communication (NFC) device. Alternatively, the transceiver 38 can be a Bluetooth beacon. The transceiver 38 can transmit and receive data and requests for input generated by the encryption module 18 and/or the computing device 12, such transmissions occurring with the user's smart phone for example. The exemplary computing device 12 is thus configured to communicate with other computing devices.

The exemplary ATM 10 also includes an advanced function dispenser (AFD) 40. The exemplary AFD 40 includes one or more processors and memory containing control logic applied by the one or more processors. The AFD 40 can also include electromechanical components and be configured to move banknotes, such as currency. The exemplary AFD 40 can be positioned in a safe 42. The exemplary computing device 12 and memory 46 are positioned outside of the safe 42. The safe 42 can include a door 43. One or more cassettes or cash boxes 44 can also be positioned and protected in the safe 42. Banknotes can be stored in the cassettes 44 for disbursement to a user of the ATM 10. The exemplary AFD 40 can extract the banknotes from one or more of the cassettes 44 and direct the banknotes out of the ATM 10 through the slot 28. The AFD 40 alternatively can direct banknotes to the recycler 26, which can direct banknotes through the slot 28. The AFD 40 can also be configured to receive banknotes from the recycler 26 and direct these banknotes to the cassettes 44 for storage. The exemplary AFD 40 can communicate with and be controlled by the computing device 12. Each of the cassettes 44 can engage the AFD 40 through a rack whereby the positioning of the cassettes is controlled. Further, each of the cassettes 44 and the AFD 40 can include mating connectors of any form, whereby a positive interconnection is confirmed electronically. When one or more of the cassettes 44 and the AFD 40 are not properly interconnected, a signal or lack thereof can be communicated to the computing device 12 whereby an error message is generated or the ATM 10 can be disabled.

FIGS. 2-7 disclose an exemplary cassette 44 that can be utilized in an ATM according to one or more implementations of the present disclosure. The exemplary cassette 44 defines a front side 48, a rear side 50, a left side 52, and a right side 54. The rear side 50 can be received first in the safe 42 when the cassette 44 is inserted in the safe 42. The rear side 50 can face a rear face 45 of the safe 42 and thus be positioned facing away from the door 43. The front side 48 can be exposed when a door of the safe 42 is opened. The exemplary cassette 44 can include a box portion 56 and a lid 58. The box portion 56 and the lid 58 can be interconnected for pivoting movement of the lid 58 relative to the box portion 56 at a pivot pin 60. The exemplary cassette 44 includes a handle 62 that can be utilized when the cassette 44 is pulled from the safe 42.

A plurality of indicators can be positioned on the rear side 50 of the cassette 44 to identify aspects of the cassette 44 to the computing device 12. For example, the indicators can be utilized to identify the nationality of the banknotes in the cassette 44 or the denomination of the banknotes. The indicators can also be utilized to confirm the presence of the cassette 44 in the safe 42 and/or confirm that the cassette 44 is properly positioned/seated in the safe 42.

The physical nature of the indicators can be selected as desired. For example, the indicators can be male or female connectors that mate with the oppositely-configured connectors of the AFD 40. Alternatively, the AFD 40 can include one or more proximity sensors that detect one or more projections on the cassette 44, wherein the projections define indicators. In another embodiment, the AFD 40 can include pressure or force sensors to detect indicators on the cassette 44.

As best shown in FIGS. 4-7, the exemplary cassette 44 includes a plurality of indicators. The exemplary indicator referenced at 62 can convey an indication of the fill level of the cassette 44 in the exemplary embodiment. The extent that the indicator 62 projects outwardly from the rear side 50 can correspond the extent that the cassette is filled with banknotes. The indicator referenced at 64 conveys an indication of the nationality of the currency in the cassette 44 in the exemplary embodiment. The exemplary indicators 62, 64 are pins biased outwardly by springs (not visible) from pin seats. Pin seats not presently supporting indicators are referenced at 66, 68, 70, for example, and other, similarly-structured pins seats are shown but not referenced by number. The indicator pins 62, 64 can press against a pressure or force sensor of the AFD 40. The computing device 12 can receive signals from such sensors to confirm attributes of the cassette 44.

FIGS. 4-7 also disclose that the exemplary cassette 44 includes indicators 72, 74. The indicators 72, 74 are buttons that are slidably received in respect apertures defined by the cassette 44 in the rear side 50. As can be seen in the Figures, the indicator 72 extends further than the indicator 74. In the exemplary embodiment, the indicator 72 conveys an indication that the cassette 44 is being inserted. Upon detection of the indicator 72, the computing device 12 prepares for complete engagement of the cassette 44. In the exemplary embodiment, detection of the indicator 74 conveys an indication that engagement of the cassette 44 has been completed. The exemplary indicator thus projects further away from the rear side 50 than the indicator 74.

Over time, the sub-components of the ATM can require replacement. One such component is memory 46. When memory 46 is replaced, the replacement memory 46 and the computing device 12 are paired with one or more security protocols in order to inhibit fraudulent activity. Such security protocols can include the exchange of electronic certificates and encrypted communications, for example.

Figure 8:
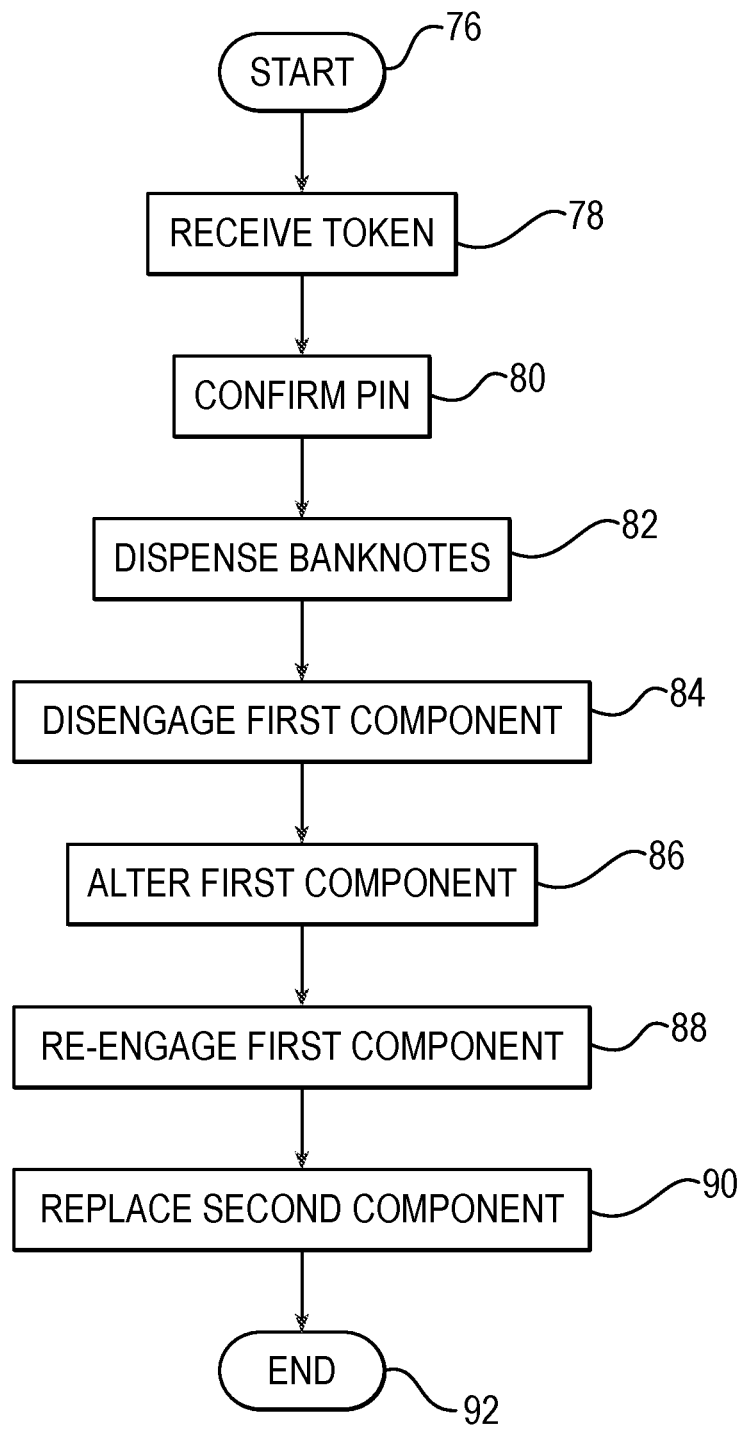
FIG. 8 is a first flow diagram of an exemplary method of operating an ATM according to one or more implementations of the present disclosure.

FIG. 8 is a flow diagram of an exemplary method of operating an ATM according to one or more implementations of the present disclosure. The method is associated, at least in part, with pairing memory 46 and computing device 12. At 76, the method starts. At 78, the ATM can be in operation and receive a token from a user. The token can be a bank card and the card can be received with the card module 22. At 80, the ATM 10 can confirm the PIN of the user. This typically involves communication between the computing device 12 and one or more other, remote computing devices. At 82, in response to 80, the ATM 10 can dispense banknotes to the user with the recycler 26 and/or the AFD 40.

Steps 76-82 indicate usage of the ATM 10 and, after some period of usage in which steps 76-82 are repeated, the memory 46 can require replacement. At 84, the operator of the ATM 10 can at least partially disengage a first component of the ATM 10 from a remainder of the ATM 10 after 82. The first component of the ATM 10 that can be disengaged from a remainder of the ATM 10 is the cassette 44 in this exemplary embodiment. Thus, at 84, the cassette 44 can be withdrawn from the safe 42. A service technician can open the door 43 of the safe 42 and at least partially remove the cassette 44 from the safe 42.

As detailed above, prior to disengagement of the cassette 44 from the remainder of the ATM 10, the computing device 12 can have previously detected the presence of the cassette 44 and the conformance of the cassette 44. In the exemplary embodiment, "conformance" is defined by the computing device 12 or the AFD 40 having first detected the presence of the indicator 72 and then the presence of the indicator 74, which indicates complete engagement of the cassette 44 in the safe 42.

At 86, the first component of the ATM 10 can be altered after being disengaged at 84. The first component can be altered to a condition that renders the first component non-conforming. The altering of the first component can involve physically modifying the first component. The altering of the first component can involve removing a portion of the first component from the remainder of the first component. In this exemplary embodiment, the indicator 72 can be removed from cassette 44 to render the cassette 44 non-conforming. The indicators 72, 74 are directed away from the door 43 of the safe 42 to inhibit any attempt at removal without drawing the cassette 44 out of the safe 42 through the door 43.

At 88, the first component can be re-engaged with the remainder of the ATM 10 after being altered at 86. After the indicator 72 has been removed, the cassette 44 can be returned to the safe 42. Thus, the cassette 44 is repositioned in the safe 42 without the indicator 72. As set forth above, the detection of the indicator 72 is one of the indications that the cassette 44 is properly positioned and fully engaged with the AFD 40. When the cassette 44 is returned to the safe 42 after the indicator 72 has been removed, the indicator 74 remains and the computing device 12 and/or AFD 40 will receive a signal corresponding to the presence of the indicator 74 but not a signal corresponding to the presence of the indicator 72. The computing device 12 and/or AFD 40 can be configured/programmed to determine that this defines non-conformance of the cassette 44. The computing device 12 and/or AFD 40 can be further configured/programmed to emit an alert, cease operations of the ATM 10, and/or perform some other action in response to detection of the indicator 74 and the failure to detect the indicator 72. In the present disclosure, the ATM 10 can be in the process of being serviced when the computing device 12 and/or AFD 40 detects that the indicator 72 is missing and that the cassette 44 is therefore non-conforming.

At 90, a second component of the ATM 10 can be replaced after 88. In the exemplary embodiment, the second component is memory 46. The replacement of the memory 46 includes pairing the memory 46 with the computing device 12. The exemplary computing device 12 is configured/programmed to pair with the replacement memory 46 only after the altering of the cassette 44. In other words, the exemplary computing device 12 is configured/programmed such that detection of the indicator 74 and the failure to detect the indicator 72 is a prerequisite to pairing with a component such as memory 46. The exemplary method ends at 92.

It is noted that, in the exemplary embodiment, after pairing of the computing device 12 and the replacement memory 46 is complete, the cassette 44 can again be removed from the safe 42 and the indicator 72 reinstalled. The cassette 44 can then be reinserted in the safe 42 and steps 76-82 can resume.

The method disclosed above can prevent jackpotting by preventing the easy exchange of intended memory with fraudulent memory. A bad actor cannot merely access a portion of the ATM that is outside of the safe in order to install fraudulent memory. However, at the same time, the present disclosure provides an enhanced process that obviates the need to position memory itself within the safe. When memory is replaced, an authorized technician can perform a few additional actions requiring little time to enhance security.

In another embodiment of the present disclosure, an indicator associated with a cassette can be a radio frequency identification (RFID) chip mounted on a card that is positioned in or on the cassette. The dispensing device could include a reader to detect the RFID chip when the cassette is appropriately positioned. The RFID chip is analogous to indicator 72 and the cassette could also include a second indicator analogous to indicator 74. The second indicator could be a second RFID chip. When pairing the computing device with a replacement component such as memory, the card bearing the RFID chip could be removed and the cassette reinserted in the ATM while the second indicator is retained on or in the cassette. The computing device would be configured/programmed such that detection of the second RFID chip and the failure to detect the first RFID chip is a prerequisite to pairing with the replacement component. In another embodiment, the cassette can be altered by removing or misaligning the lid.

Figure 9:
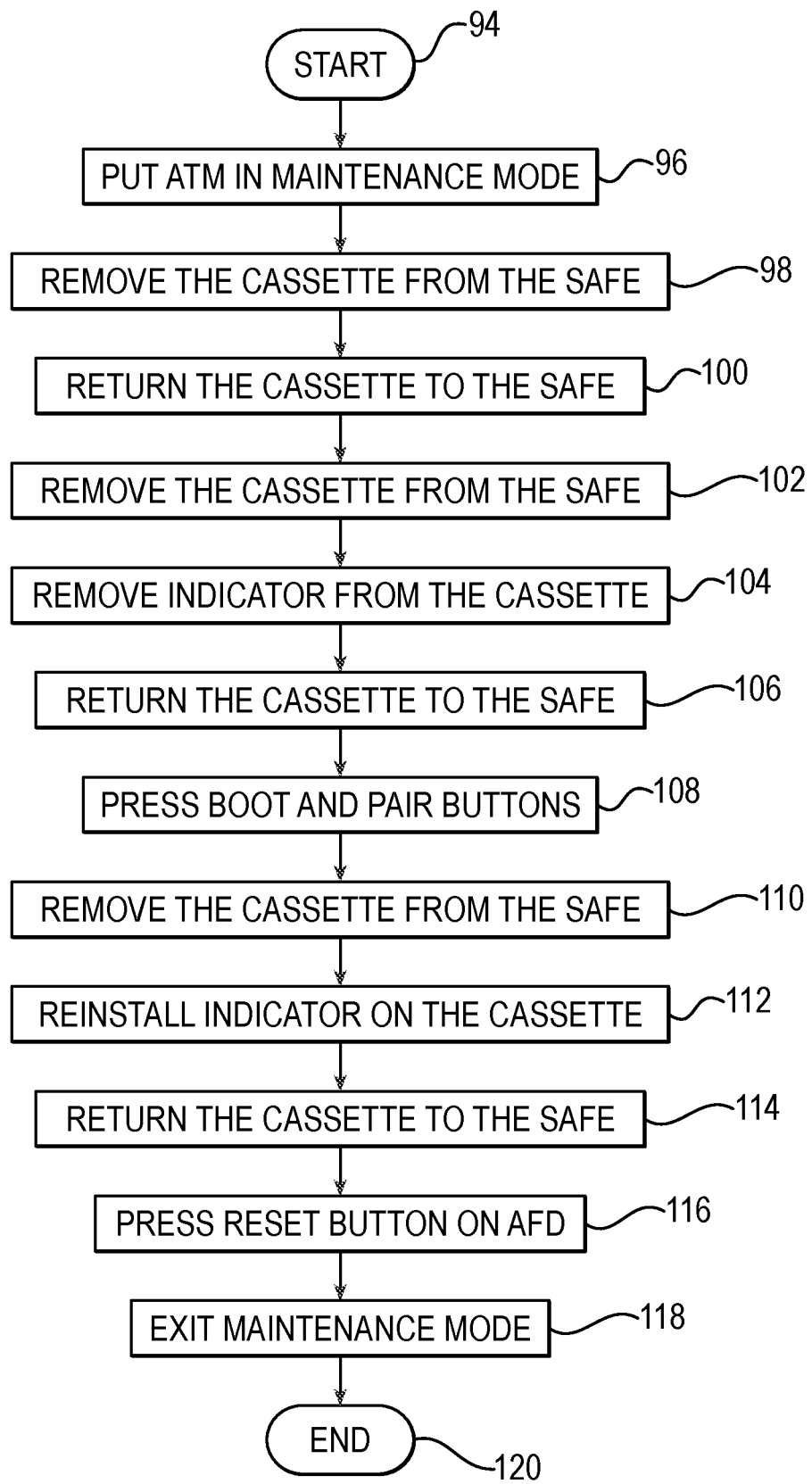
FIG. 9 is a second flow diagram of an exemplary method of operating an ATM according to one or more implementations of the present disclosure.

FIG. 9 is a flow diagram of another exemplary method of operating an ATM according to one or more implementations of the present disclosure. The method is associated, at least in part, with pairing memory 46 and computing device or PC 12, while implicating the AFD 40 and components in the safe 42 to prevent the replacement of legitimate memory with fraudulent memory. Fraudulent memory can be utilized to permit jackpotting of the ATM 10. At 94, the method starts. At 96, the ATM 10 is taken out of service and placed in a maintenance or diagnostics mode. The ATM 10 can be placed in maintenance mode through a physical switch positioned at some location within the ATM 10.

At 98, the safe 42 can be opened and a cassette 44 can be drawn from the safe 42. At 100, the cassette 44 can be returned to the safe 42. Steps 98 and 100 are useful to "baseline" the cassette 44 relative the AFD 40. In other words, steps 98 and 100 allow the computing device 12 or the AFD 40 to test the conformance of the cassette 44 and establish that the cassette 44 has the indicator 72 and is in conformance before replacing the memory 46. Because the ATM 10 is in maintenance mode, an error message will not be communicated from the AFD 40 to the PC 12.

At 102, the cassette 44 can again be drawn from the safe 42. At 104, the indicator 72 can be removed from the cassette 44. At 106, the cassette 44 can again be returned to the safe 42. The AFD 40 or the computing device 12 will detect that the cassette 44 is missing the indicator 72.

At 108, a boot button on the AFD 14 can be pressed and a pair button/command on the PC 12 can be pressed/initiated. In the present embodiment, these two actions are executed within about two minutes of one another. Pairing of the PC 12, the AFD 14 and memory 46 will then begin. Thus, as described thus far, detection that the indicator is missing is a prerequisite to pairing.

When pairing has been completed, the various components of the ATM 10 will re-initialize. After pairing, at 110, the cassette 44 can again be drawn from the safe 42. At 112, the indicator 72 can be reinstalled on the cassette 44. At 114, the cassette 44 can again be returned to the safe 42.

At 116, a reset button on the AFD 40 can be pressed to address the previous detection of the missing indicator 72. At 118, the AFD 40 can be removed from maintenance mode. The process can end at 120.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein is hereby unconditionally reserved. The use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure; an "invention" is defined by the content of a patent claim and not by the content of a detailed description of an embodiment of an invention.

What is claimed is:

1. A method of operating an automated transaction machine (ATM) comprising:
   receiving, at an ATM, a token from a user;
   confirming, with the ATM, a personal identification number (PIN) of the user;
   dispensing, with the ATM, banknotes to the user in response to said confirming;
   at least partially disengaging a first component of the ATM from a remainder of the ATM after said dispensing;
   altering the first component of the ATM to a condition that renders the first component non-conforming after said at least partially disengaging;
   re-engaging the first component with the remainder of the ATM after said altering; and
   replacing a second component of the ATM after said re-engaging, including pairing the second component of the ATM with a computing device of the ATM, wherein said pairing is responsive at least in part to said altering.

2. The method of claim 1 wherein said at least partially disengaging is further defined as:
   at least partially disengaging the first component that is positioned within a safe of the ATM during said dispensing from the remainder of the ATM after said dispensing.

3. The method of claim 2 wherein said replacing the second component is further defined as:
   replacing, after said re-engaging, the second component of the ATM that is positioned outside of the safe during said dispensing, including pairing the second component of the ATM with the computing device of the ATM, wherein said pairing is responsive at least in part to said altering.

4. The method of claim 1 wherein said altering is further defined as:
   physically modifying the first component.

5. The method of claim 4 wherein said altering is further defined as:
   removing a portion of the first component from the remainder of the first component.

6. The method of claim 5 wherein said altering is further defined as:
   removing a button that is slidably received in an aperture defined by the first component.

7. The method of claim 6 wherein said altering is further defined as:
   removing the button that is slidably received in the aperture defined by the first component and directed away from a door of a safe during said dispensing.

8. The method of claim 5 wherein said re-engaging is further defined as:
   repositioning the first component in a safe of the ATM, without the portion removed during said removing, with the remainder of the ATM after said altering.

9. The method of claim 1 further comprising:
   at least partially disengaging the first component of the ATM from the remainder of the ATM a second time, after said replacing of the second component;
   restoring the first component of the ATM to a conforming condition after said at least partially disengaging the first component of the ATM from the remainder of the ATM the second time; and
   re-engaging the first component with the remainder of the ATM a second time, after said restoring.

10. The method of claim 9 further comprising:
repeating said receiving, said confirming, and said dispensing after said re-engaging the first component with the remainder of the ATM the second time.

11. The method of claim 1 further comprising:
placing a first processing device of the ATM in a maintenance mode of operation after said dispensing and before said at least partially disengaging the first component of the ATM from the remainder of the ATM; and
testing a conformance of the first component after said placing and before said at least partially disengaging the first component of the ATM from the remainder of the ATM.

12. The method of claim 11 further comprising:
at least partially disengaging the first component of the ATM from the remainder of the ATM a second time, after said replacing of the second component;
restoring the first component of the ATM to a conforming condition after said at least partially disengaging the first component of the ATM from the remainder of the ATM the second time;
re-engaging the first component with the remainder of the ATM a second time, after said restoring; and
rebooting the first processing device after said re-engaging the second time.

13. The method of claim 12 further comprising:
pairing the first processing device with the computing device of the ATM after said rebooting.

14. The method of claim 13 further comprising:
removing the first processing device from maintenance mode after said pairing.

15. The method of claim 1 wherein said at least partially disengaging is further defined as:
at least partially disengaging the first component that is a currency cassette of the ATM from the remainder of the ATM after said dispensing.

16. The method of claim 15 wherein said replacing is further defined as:
replacing a second component of the ATM that is memory accessed by the computing device of the ATM during at least one of said confirming and said dispensing.

17. The method of claim 1 further comprising:
detecting, with the computing device of the ATM, non-conformance of the first component of the ATM after said re-engaging.

18. The method of claim 17 wherein said replacing is further defined as:
replacing the second component of the ATM after said re-engaging, including pairing the second component of the ATM with the computing device of the ATM, wherein said pairing is responsive at least in part to said altering and wherein said detecting non-conformance is required to complete said pairing.

19. The method of claim 17 further comprising:
detecting, with the computing device of the ATM, conformance of the first component of the ATM prior to said receiving.

20. The method of claim 17 wherein said detecting further comprises:
detecting, with the computing device of the ATM, a physical characteristic of the first component to determine non-conformance of the first component.

* * * * *